United States Patent
Nieleck et al.

(10) Patent No.: US 7,737,355 B2
(45) Date of Patent: Jun. 15, 2010

(54) ELECTRICAL JUNCTION AND JOINT BOX FOR A SOLAR CELL MODULE

(75) Inventors: Udo Nieleck, Werdohl (DE); Dirk Quardt, Iserlohn (DE); Friedel Wasserfuhr, Wipperfuerth (DE); Zbigniew Zborowski, Luedenscheid (DE)

(73) Assignee: Guenther Spelsberg GmbH & Co. KG, Schalksmuehle (DE)

(*) Notice: Subject to any disclaimer, the term of this patent is extended or adjusted under 35 U.S.C. 154(b) by 994 days.

(21) Appl. No.: 11/024,016

(22) Filed: Dec. 29, 2004

(65) Prior Publication Data

US 2005/0161080 A1  Jul. 28, 2005

(51) Int. Cl.
*H01L 25/00* (2006.01)
*H01R 12/00* (2006.01)

(52) U.S. Cl. .............. 136/243; 439/76.1; 439/188; 439/329

(58) Field of Classification Search .......... 136/293, 136/251, 256; 439/76.1
See application file for complete search history.

(56) References Cited

U.S. PATENT DOCUMENTS

| | | | |
|---|---|---|---|
| 2,920,303 A | * | 1/1960 | Johnson ............... 439/411 |
| 3,319,216 A | * | 5/1967 | McCullough ......... 439/493 |
| 5,238,411 A | * | 8/1993 | Jinno et al. ........... 439/59 |
| 5,268,038 A | * | 12/1993 | Riermeier et al. .... 136/251 |
| 5,503,684 A | | 4/1996 | Duran |
| 5,730,612 A | * | 3/1998 | Tatsuzuki ............. 439/188 |
| 6,066,797 A | | 5/2000 | Toyomura et al. |
| 6,166,321 A | * | 12/2000 | Sasaoka et al. ....... 136/251 |
| 6,369,315 B1 | | 4/2002 | Mizukami et al. |
| 2003/0034064 A1 | * | 2/2003 | Hatsukaiwa et al. .. 136/251 |

FOREIGN PATENT DOCUMENTS

| | | |
|---|---|---|
| DE | 43 42 761 A1 | 6/1995 |
| DE | 101 59 852 C1 | 9/2003 |
| EP | 1 289 069 A2 | 3/2003 |

* cited by examiner

*Primary Examiner*—Alexa D Neckel
*Assistant Examiner*—Miriam Berdichevsky
(74) *Attorney, Agent, or Firm*—David S. Safran; Roberts Mlotkowski Safran & Cole, P.C.

(57) ABSTRACT

An electrical junction and joint box for a solar cell module having solar cells and an associated method. The junction and joint box and solar cell module are connected by conductor strips. The junction and joint box includes a housing having electrical and/or electronic means and a connection device located in the housing. The connection device is arranged to directly, without manual alteration, receive thin conductor strips routed out of the solar cell module from underneath when the junction and joint box is seated on the solar cell module. In this way reliable and efficient connection of the individual solar cells of the solar cell module can be easily achieved, and faulty contact-making can be avoided.

5 Claims, 4 Drawing Sheets

ELECTRICAL JUNCTION AND JOINT BOX FOR A SOLAR CELL MODULE

BACKGROUND OF THE INVENTION

1. Field of the Invention

The present invention is directed to an electrical junction and joint box for use with a solar cell module having solar cells. More specifically, the present invention is directed to an electrical junction and joint box with a housing and electrical and/or electronic means and a connection device provided in the housing.

2. Description of Related Art

Since an output voltage associated with individual solar cells is generally too low to operate electrical devices, such as household appliances or the like, several solar cells are normally interconnected into solar cell modules. On one hand, there is the possibility of series connection of individual solar cells and, on the other, there is the possibility of parallel connection of the solar cells in the solar cell module. The individual currents of the solar cells in parallel connection are added to one another to create an overall current. The solar cells should have essentially the same physical properties so that current required is not increased. In practice, however, parallel connection of solar cells is not normally used, since an individual solar cell can already deliver a current of a few amperes.

When solar cell modules are assembled having multiple solar cells, the solar cells are often series connected. However, a problem can arise when a series connected solar cell module is partially shadowed or obstructed from sunlight, so that a solar cell or individual solar cells of the solar cell module receive less solar radiation, or none at all. The reason for reduced solar irradiation can be, for example, fouling of the solar cells or shadows cast by trees, building facilities or buildings.

In contrast to shadowing of the solar module uniformly over its entire surface, which leads only to a reduction in power, a specific problem arises when a solar cell is subjected to partial shadowing. In normal operation, a common current flows through the series-connected solar cells of the solar cell module, and each individual solar cell, with its respective voltage, contributes to the overall voltage of the solar cell module. However, if one solar cell is shadowed, it no longer generates any voltage and in practice acts as a diode, in the reverse direction, and opposes the current flow in the solar cell module. As a result, the entire module can no longer deliver current, so that the entire operation of the solar cell module is adversely affected.

Moreover, on the shadowed solar cell, a voltage is dependent on the position of the shadowed solar cell in the series circuit. If the voltage is greater than its blocking voltage, a breakdown occurs in the solar cell, and thus, the solar cell is permanently damaged. Even if the solar cell should not be damaged by the breakdown, in the partially shadowed solar cell, a large power loss is converted so that the shadowed solar cell heats up. This heat-up can lead to damage on the shadowed solar cell, as well as surrounding solar cells.

In order to avoid problems associated with partially shadowed solar cells, diodes (e.g., bypass diodes) are often used and are connected antiparallel to the solar cells. This results in that a shadowed solar cell no longer delivers any portion to the total voltage of the solar cell module, but the current flow is nevertheless maintained. The solar cell module thus shows only a reduced operating voltage, but does not break down completely. Moreover, in the shadowed solar cell, power is no longer converted so that damage to the shadowed solar cell can be avoided.

A diode could be assigned to each solar cell of a solar cell module. However, often a plurality of solar cells connected in succession is protected by a common diode. Generally electrical junction and joint boxes, which are used for solar cell modules, thus houses a plurality of bypass diodes. Moreover, in electrical junction and joint boxes there can be other electrical and/or electronic means so that the conductors fed to the electrical junction and joint box are properly connected to electrical and/or electronic means, such as bypass diodes.

The solar cells in a solar cell module are generally connected to one another with thin conductor strips (so-called strings). These conductor strips typically have a thickness of a few tenths of a millimeter (roughly 0.3 mm) and a width of a few millimeters (roughly 3-8 mm). These conductor strips, which connect the individual solar cells of the solar cell module to one another, are routed out of the solar cell module so that the thin conductor strips can be used directly for connection purposes.

To do this, the conductor strips are typically routed into a junction and joint box from underneath. The box includes a removable cover so that contact can be made with the individual conductor strips by hand in an electrical connection device, which is provided in the housing of the junction and joint box. The thin conductor strips which come from the solar cell module, from underneath relative to the housing of the junction and joint box, are generally bent (manually) by 180° in order to then be connected coming from the top in the connection device. This bending is easily possible since the thin conductor strips, which typically consist of metal have low thickness, are very flexible. However, this approach is very complex and time-consuming, and connection faults cannot be easily avoided.

SUMMARY OF THE INVENTION

Therefore, an object of the invention is to provide a junction and joint box for a solar cell module with which simple and reliable connection of thin conductor strips routed out of the solar cell module is enabled.

Proceeding from the above-described electrical junction and joint box, the object of the present invention is achieved by providing a connection device that is structured and arranged such that thin conductor strips routed out of the solar cell are automatically inserted from underneath into the electrical connection device when the junction and joint box is seated on the solar cell module.

Therefore, the invention employs a completely new approach with regard to the thin conductor strips used for connection of the solar cells and routed out of the solar cell module. Specifically, when the junction and joint box is seated on the solar cell module, the thin conductor strips are, on one hand, routed automatically, without additional manual effort, and on the other hand, directly from underneath, into the electrical connection device. The invention thus avoids the complex process discussed above which routes the thin conductor strips for connection of the solar cells in the junction and joint box first up and than bends them by 180° in order to supply then to the connection device. When the solar cells of the solar cell module are connected, the required effort is therefore greatly reduced by the invention and especially almost no improper contact-making occurs.

Basically, for the junction and joint box of the present invention, different types of connection devices can be used. According to one embodiment of the invention, the electrical connection device includes a clamping means. In particular, the clamping means has connection spring elements for producing clamping contact with the thin conductor strips. The connection spring elements have at least one spring, preferably two springs (e.g., leaf springs) which act against one another based on a spring force. The spring (or springs) acts on the conductor strips, when they are pushed into the connection device to thus establish electrical contact.

The connection device can be arranged in the housing of the electrical junction and joint box such that the thin conductor strips routed out of the solar cell module, when the junction and joint box is seated on the solar cell module, are routed automatically from underneath into the electrical connection device without there being additional means which support the routing of the conductor strips into the connection device. According to one exemplary embodiment of the invention, located underneath the clamping means is a guide means for guided insertion of the thin conductor strips into the clamping means when the junction and joint box is seated on the solar cell module. The guide means is used essentially to prevent kinking or folding of the conductor strips during insertion. The force of the conductor strips acting in the lengthwise direction (of the thin conductor strips) when they are inserted into the connection device also acts in the desired direction and does not lead to deformation. The guide means includes openings which correspond to the cross sectional dimensions of the thin conductor strips so that when the junction and joint box is seated on the solar cell module the thin conductor strips are routed in these openings with little play. The inside walls of the openings therefore are used for the actual guidance and thus prevent kinking or folding.

When the junction and joint box is seated on the solar cell module, the thin conductor strips are routed out of the solar cell module, from underneath, and automatically (without manual manipulation) into the electrical connection device, which reveals another advantage. According to one exemplary development of the invention, the housing has side walls and a cover. The side walls and the cover are made in one piece. In other words, with regard to the electrical junction and joint box it is no longer absolutely necessary to provide a removable cover. Finally, the insertion of the thin conductor strips into the connection device takes place automatically, upon seating of the junction and joint box on the solar cell module, so that the interior of the electrical junction and joint box need not be accessible from the top for connection by hand.

The invention is also directed to a method for connecting an electrical junction and joint box having a connection device with a solar cell module having solar cells connected to one another. The method includes routing thin conductor strips from the solar cell module directly to the junction and joint box seated on the solar cell module from underneath into the electrical connection device.

According to another aspect of the invention, the electrical connection device has a clamping means so that when the junction and joint box is seated on the solar cell module the thin conductor strips are clamped from underneath in the connection device. In particular, the clamping means has connection spring elements for producing clamping contact with the thin conductor strips. Finally, when the junction and joint box is seated on the solar cell module, the thin conductor strips are routed in order to ensure proper insertion of the conductor strips into the clamping means.

In particular, there are a host of possibilities for embodying and developing the electrical junction and joint box of the invention, in which the following detailed description and associated drawings provide one exemplary embodiment of the invention.

DETAILED DESCRIPTION OF THE INVENTION

Figure 1A:
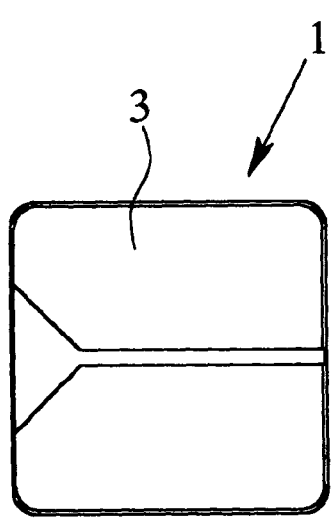
FIGS. 1a, 1b and 1c show an electrical junction and joint box for a solar cell module according to one preferred embodiment of the invention in a view from the top, from the side, and from underneath, respectively.
Figure 1B:
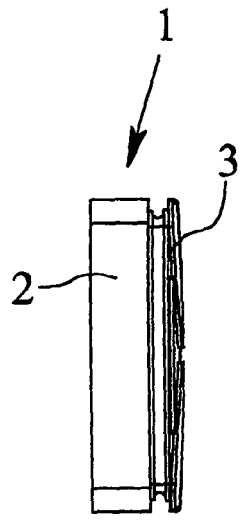
Figure 1C:
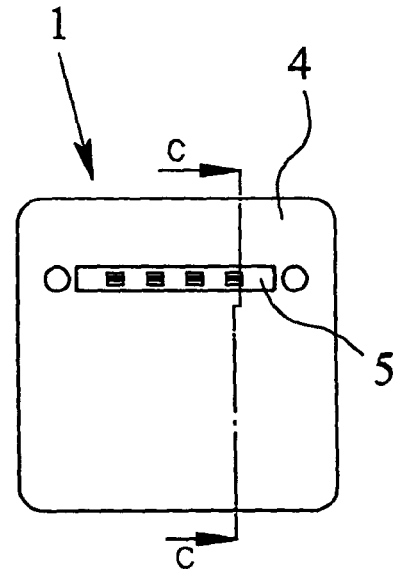
Figures 2A, 2B:
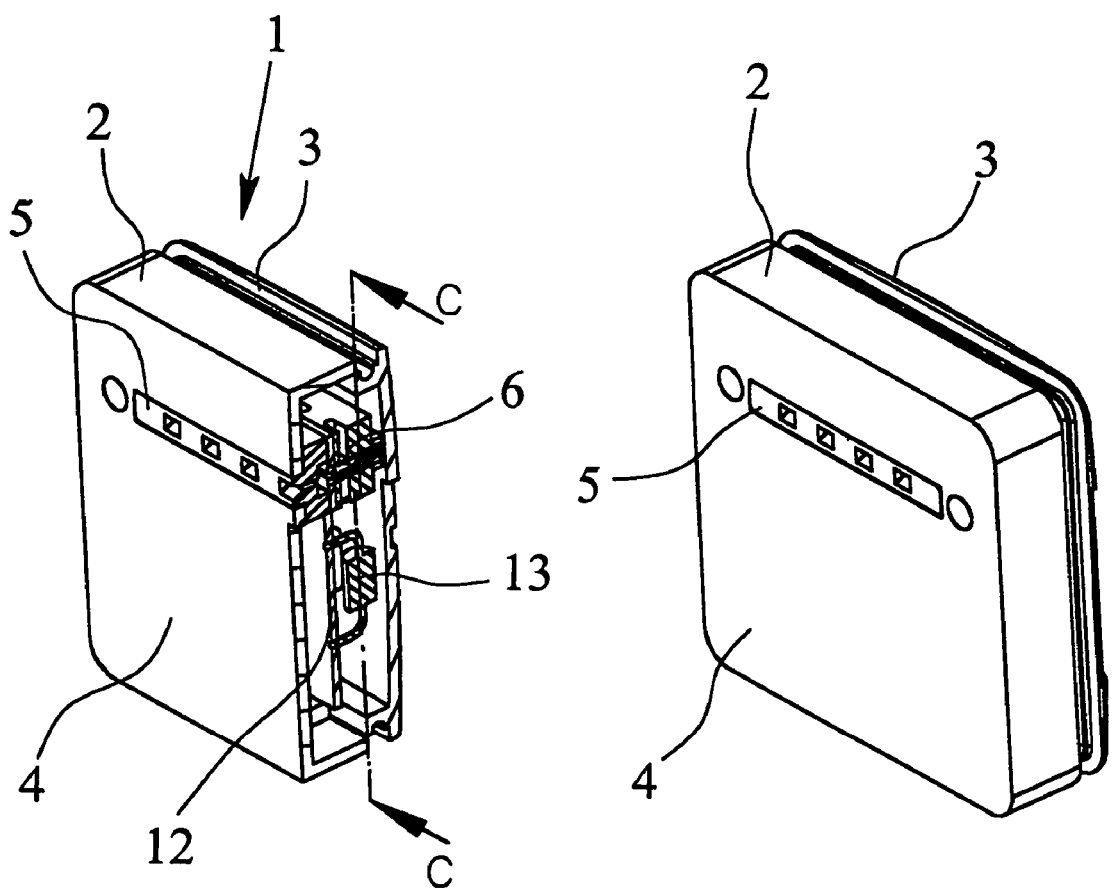
FIGS. 2a & 2b show perspective views of the electrical junction and joint box according the preferred embodiment of the invention, FIG. 2a being a sectional view of the box taken along line C-C in FIG. 1c.

FIGS. 1a, 1b and 1c illustrate top, side and bottom views, respectively, of an electrical junction and joint box according to a preferred embodiment of the invention. The electrical junction and joint box includes a housing 1 with side walls 2 and a cover 3. Furthermore, a bottom 4 of the housing 1 has an elongated recess 5. As shown in FIG. 2a, a connection device 6, provided in the housing 1, can be reached via the recess 5.

Figure 3:
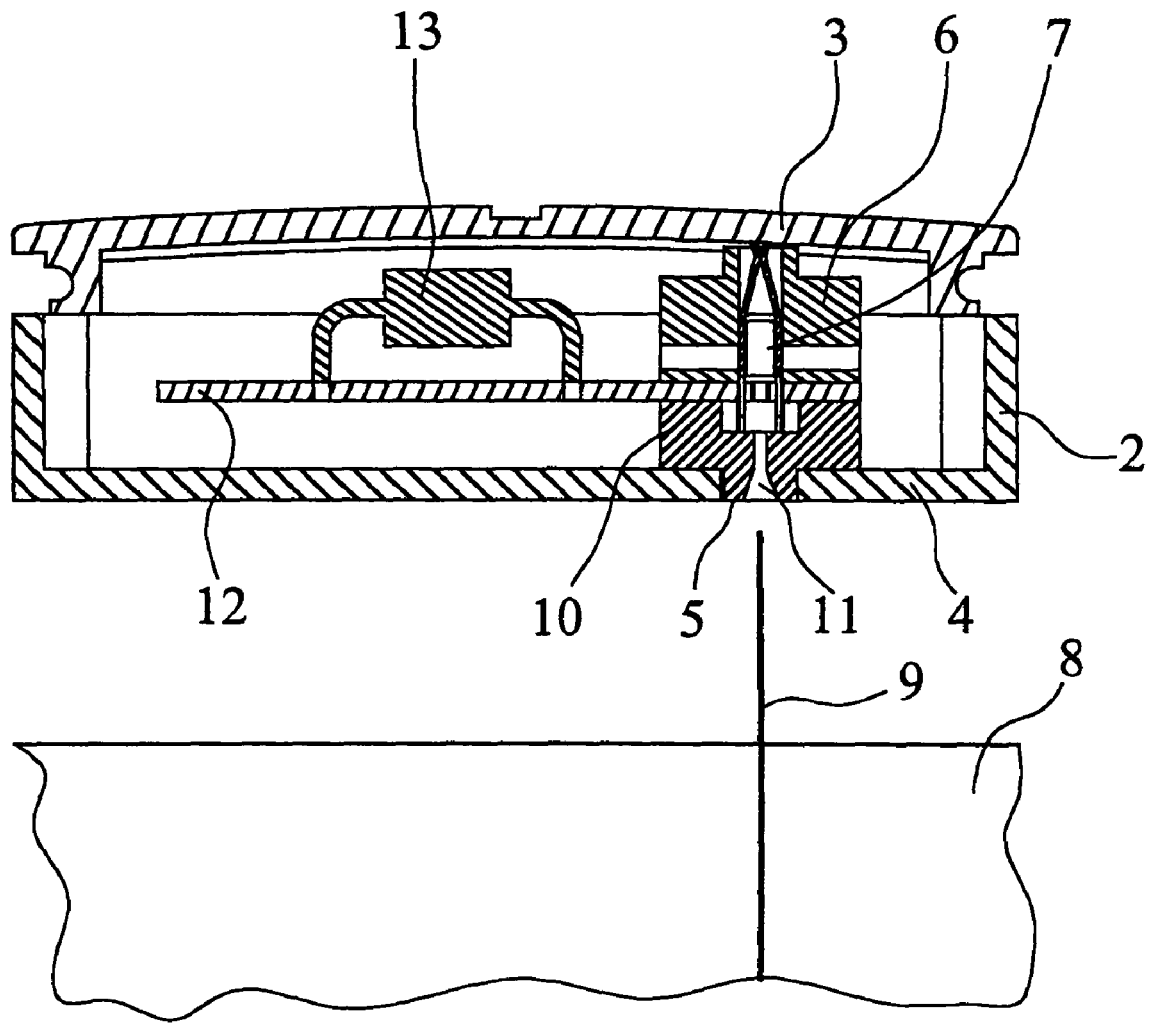
FIG. 3 shows a section through the electrical junction and joint box according to the preferred embodiment of the invention.

The structure and arrangement of connection device 6 is described in more detail with reference to FIG. 3, which shows a section through the electrical junction and joint box according to the present invention along line C-C shown in FIG. 1c. FIG. 3 shows that the connection device 6 has a clamping means 7 in the form of two oppositely acting springs. When the junction and joint box is seated, according to the preferred embodiment of the invention, thin conductor strips 9 are routed out of a solar cell module 8 and are automatically inserted into the clamping means.

In order to prevent deformation (e.g., kinking or folding) of the conductor strips 9 when the conductor strips 9 are inserted into the connection device 6, a guide means 10 is employed in the housing 1 underneath the connection device 6. The guide means 10 has an insertion opening 11 which has a funnel-shaped tapered cross section so that the conductor strips 9 are routed in the guide means 10 with little play in the transverse direction. In this way, kinking of the conductor strips 9 upon insertion into the connection device 6 is avoided. A force applied by insertion of connector strips 9, when the electric junction and joint box is seated on the solar cell module, can act substantially in the lengthwise direction of the thin conductor strips 9.

Figure 4:
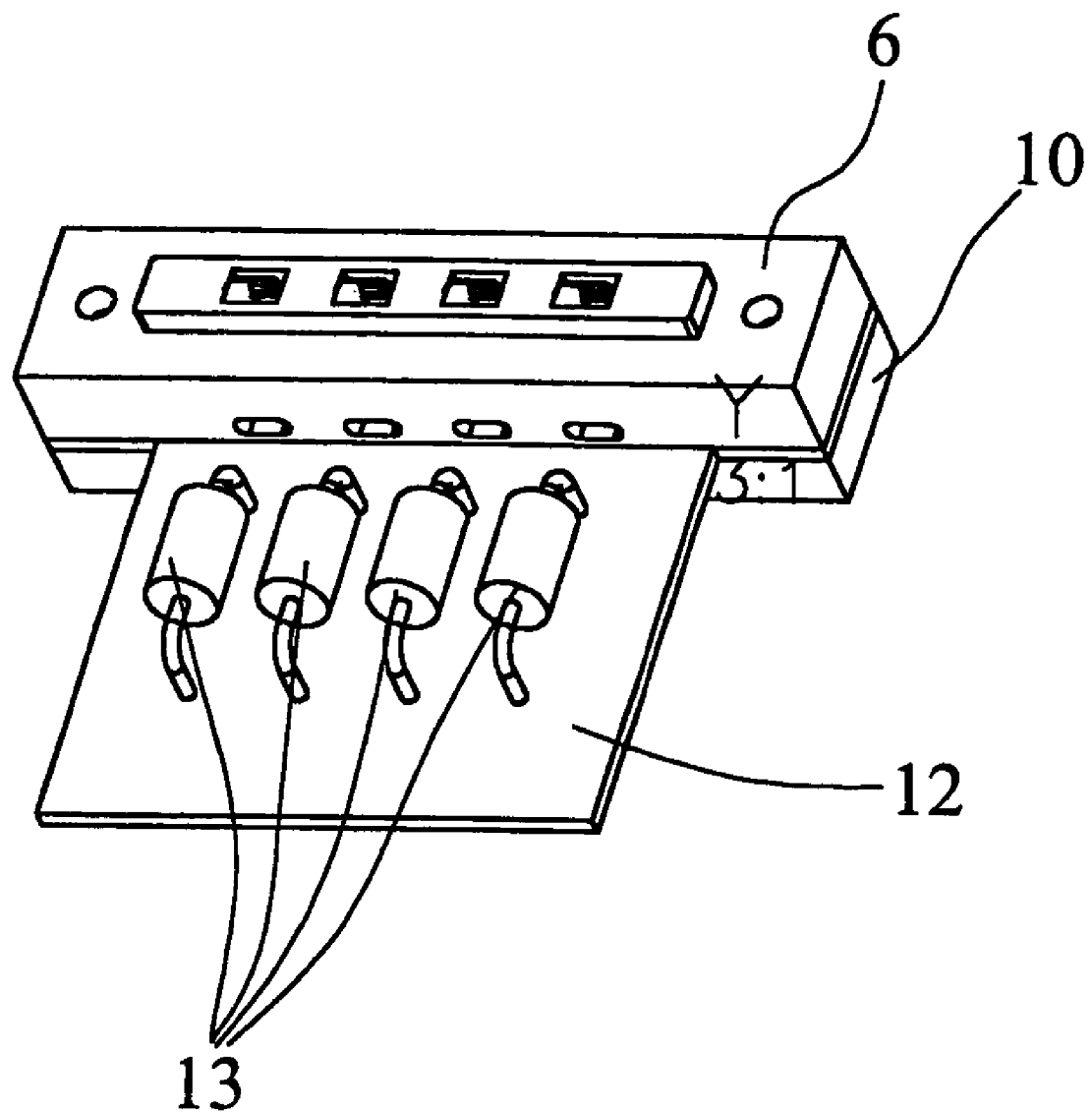
FIG. 4 shows the connection device of the electrical junction and joint box according to the preferred embodiment of the invention.

In FIGS. 3 & 4, the connection device 6 is connected to a circuit board 12 on which there is a host of bypass diodes 13. The bypass diodes 13 have the previously described function of safeguarding individual solar cells and, for this purpose, are connected to the individual solar cells of solar cell module 8 via the connection device 6 and the thin conductor strips 9.

As the description of the electrical junction and joint box above according to the preferred embodiment of the invention shows, the present invention provides a completely new approach in that the flexible thin conductor strips 9 are inserted not only from underneath into the housing of the junction and joint box, but also directly from underneath into the connection device 6 which is provided in the housing 1. Here, the connection device 6 is made and arranged with a guide means 10, such that when the electrical junction and joint box is seated on the solar cell module 8 insertion of the conductor strips 9 into the connection device 6 takes place automatically. Thus, the connection of the individual solar cells of the solar cell module 8 is greatly facilitated and faulty contact-making can be avoided.

What is claimed is:

1. An electrical junction and joint box for a solar cell module having solar cells, wherein the junction and joint box and solar cell module are connected by flexible thin conductor strips, said junction and joint box comprising:

a housing having at least one of electrical and electronic means and a connection device located in the housing, wherein the connection device is arranged to directly, without manual alteration, receive flexible thin conductor strips routed out of the solar cell module from underneath when the junction and joint box is seated on the solar cell module, wherein a guide means is located underneath the connection device to receive the flexible thin conductor strips in the connection device when the junction and joint box is seated on the solar cell module, wherein the guide means has an insertion opening which has a funnel-shaped tapered cross section so that the flexible thin conductor strips are routed in the guide means with little play in the transverse direction and then are routed automatically, without additional manual effort directly from underneath into the electrical connection device, wherein the guide means forms an inlet into the housing of the electrical junction and joint box, wherein clamping means of the electrical connection device are received in a recess formed on an opposite side of the guide means from the funnel-shaped insertion opening of the guide means, and wherein said at least one of electrical and electronic means comprises a circuit board, the housing having an insertion slot through which an edge portion of the circuit board is inserted into the housing so as to be received between the connection device and the guide means with the clamping means extending through the edge portion of the circuit board and with a portion of the circuit board remaining outside of the housing.

2. The electrical junction and joint box of claim 1, wherein the clamping means further comprises connection spring elements for producing clamping contact with the conductor strips.

3. The electrical junction and joint box of claim 1, wherein the housing has side walls and a cover, the side walls and the cover being one piece.

4. The electrical junction and joint box of claim 1, wherein the connection device, including the clamping means thereof, are separate parts from the guide means.

5. The electrical junction and joint box of claim 1, wherein the guide means projects into an opening that extends through an outer wall of the housing of the electrical junction and joint box.

* * * * *